July 13, 1943.  P. DODGE  2,324,291
PUMPS
Filed June 15, 1942
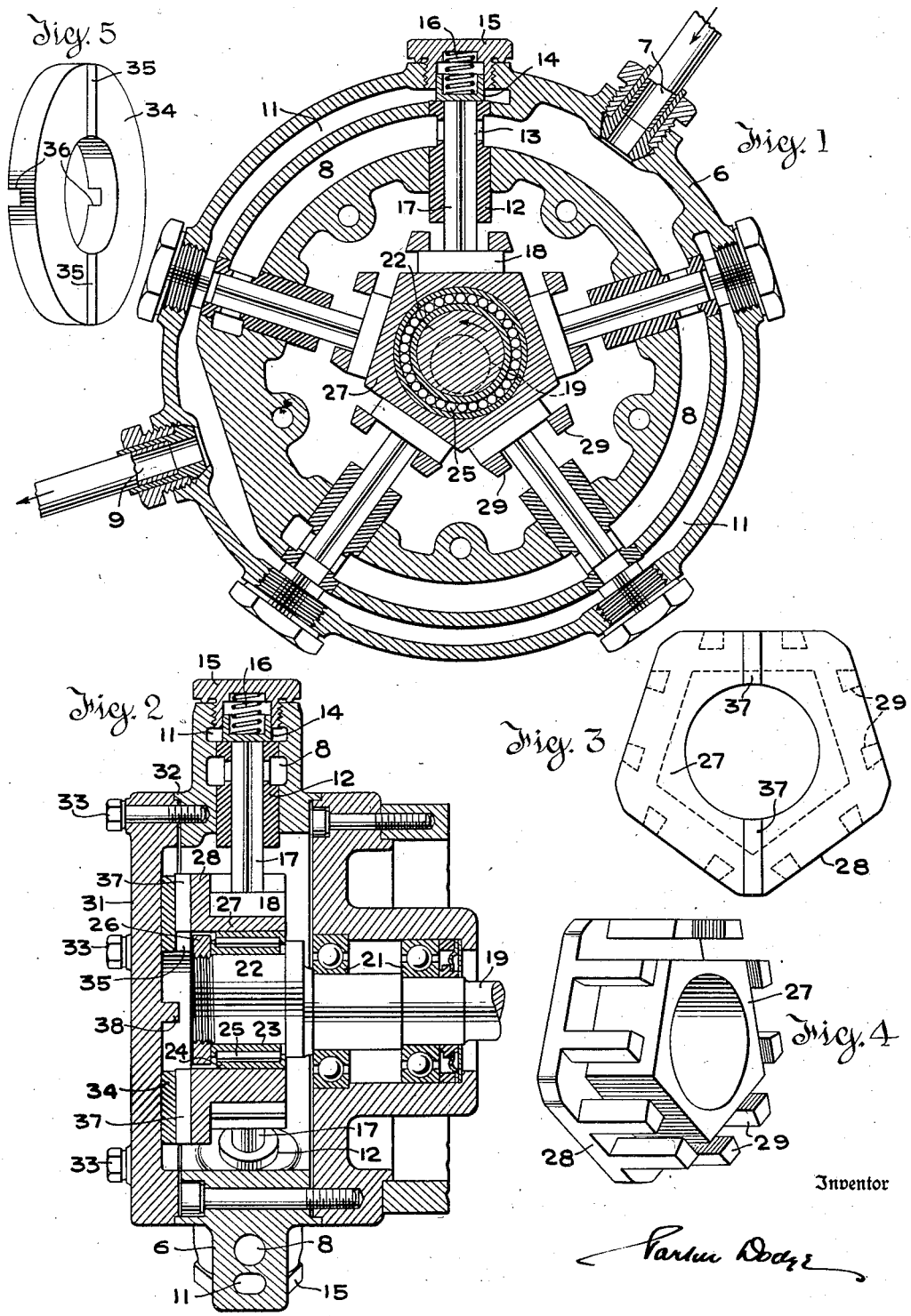
Inventor
Parker Dodge Patented July 13, 1943

2,324,291

UNITED STATES PATENT OFFICE 2,324,291

PUMP

Parker Dodge, Chevy Chase, Md., assignor to Hydraulic Controls, Inc., a corporation of Illinois Application June 15, 1942, Serial No. 447,143

6 Claims. (Cl. 74—50)

This invention relates to high pressure pumps and particularly to the plunger actuating mechanism of multiple cylinder pumps in which the cylinders are radially arranged around a single actuating eccentric.

In such pumps the plungers have been equipped with head blocks which are confined in guides on a polygonal thrust block, swiveled on an actuating eccentric. This arrangement affords positive actuation of the plungers in both directions but some difficulty arising from excessive friction is encountered and various expedients have been suggested to ensure free action of the head blocks in their guides.

The difficulty arises from the fact that at high pump speeds and when pumping against high head pressures, the turning moment on the polygonal thrust block is substantial, and in prior pumps is resisted solely by the head blocks. This causes cramping of the head blocks in their guides with attendant lateral thrusts on the plungers, causing the plungers to wear and bind.

The present invention provides means independent of the head blocks to resist the rotary tendency of the thrust blocks. This checks the difficulty at its source, and with accurate workmanship, ensures free action regardless of speed and head-pressure. The desired result is simply secured by interposing an Oldham coupling between the thrust block and a fixed portion of the pump housing, so that the thrust block is permitted to revolve but is restrained positively against rotary movement.

A simple radial pump embodying the invention is illustrated in the accompanying drawing. In the drawing:

Fig. 1 is a section through the pump on the plane of the plunger axes.

Fig. 2 is a vertical axial section.

Fig. 3 is a face view of the thrust block.

Fig. 4 is a perspective view of the thrust block.

Fig. 5 is a perspective view of the coupling ring.

The housing of the pump comprises a casting 6 with suction connection 7, leading to the inlet passages 8 and discharge connection 9, leading from the discharge passages 11. The pump cylinders are radially arranged and comprise bushings 12 pressed to place and having side inlet ports 13 communicating with the inlet passages 8. The outer ends of cylinder bushings open into the discharge passages 11 and are controlled by cup-shaped discharge valves 14. These are guided in the removable plugs 15 and urged closed by coil compression springs 16.

Plain cylindrical plungers 17 work in the bushings 12 and at their innermost position open the inlet ports 13. Each plunger has an actuating head block 18 which is rectangular in cross section and at right angles to the plunger.

The drive shaft 19 is mounted in two annular ball bearings 21 and carries an integrally formed eccentric 22. Mounted on the eccentric is a needle bearing assembly comprising an inner race 23, outer race 24, and interposed needle rollers 25. A nut 26 retains the bearing assembly.

Slipped over race 24 and making a close fit therewith is the polygonal head block. Since the illustrated pump has five cylinders it is pentagonal. It comprises a main thrust portion 27, a flange 28 and the fingers 29 projecting from flange 28. As clearly shown in Figs. 1 and 2, the head blocks 18 each engage a corresponding side of the pentagonal thrust portion 27, with its ends underlying fingers 29. The plunger 17 lies between two fingers 29 which are spaced sufficiently to permit the necessary sliding movement of the head block.

This construction permits ready removal and replacement of the thrust block after removal of the front cover 31, which is centered by flange 32 and held by machine screws 33.

The pump so far described is typical of prior art structures. They develop high friction because the rotary tendency of thrust block 26 is absorbed by head blocks 18 and plungers 17. An analysis will show that the stresses tend to cause the blocks 18 to cramp in their guides, and plungers 17 to bind in bushings 12. The effect is cumulative and self-intensifying, once it starts.

To hold the thrust block against its rotary tendency while permitting it to revolve, a ring 34 is interposed between flange 28 of the thrust block and the inner face of cover 31. Ring 34 has on one face a groove 35 and on the other face at 90° to groove 35 a second groove 36. One groove is closely engaged by rib 37 on the flanged face of block 27 (see Fig. 3) and the other by rib 38 on the inner face of cover 31.

The connection is, in effect, an Oldham coupling heretofore used to connect, end to end, shafts which are slightly out of line, but parallel. It is desirable to make the ring 34 as light as practicable since it oscillates in a line path (horizontal in the case illustrated) and cannot readily be counter-balanced.

While the Oldham coupling is believed to be the simplest and most practical arrangement for holding the block 27 against rotation while permitting it to revolve, the broad inventive concept is the provision of means distinct from the plunger heads and plungers for effecting this result, so as to relieve the plunger parts from cramping loads. Other mechanism for effecting this result can be used.

The invention is particularly useful where the thrust block drives the plungers positively in both directions, but it can be used with some benefit where the plungers are actuated in one direction by the thrust block and in the opposite direction by springs, or are cross-connected in pairs by links, which are rigid or elastic. These types of radial pump are all well known in the art.

I claim:

1. In a pump, the combination of a rotary shaft; an eccentric on said shaft; a block swiveled on the eccentric and having a plane thrust face parallel with the axis of the shaft; a cylinder mounted with its axis substantially radial to said shaft; a plunger working in said cylinder and having a thrust head on its end in coactive relation with the plane surface on said block; means for maintaining the plunger and block in coactive relation; and means independent of the plunger for holding the block against rotation while permiting it to revolve about the axis of the shaft.

2. In a pump, the combination of a pump housing; a rotary shaft mounted therein; an eccentric on said shaft; a block swiveled on the eccentric and having a plane thrust face parallel with the axis of the shaft; a cylinder mounted in said housing with its axis substantially radial to said shaft; a plunger working in said cylinder and having a thrust head on its end in coactive relation with the plane surface on said block; means for maintaining the plunger and block in coactive relation; and means independent of the plunger for holding the block against rotation while permitting it to revolve about the axis of the shaft, said means comprising a Oldham coupling interposed between the block and a portion of the pump housing.

3. In a pump, the combination of an eccentric rotatable about an axis; a plurality of cylinders angularly spaced about said axis and having their axes radial to the first named axis; a block in which said eccentric rotates; a piston reciprocable in each cylinder, each of said pistons having an actuating head mounted in a confining guideway in said block to permit relative motion of the piston and block in a direction transverse to the axis of the piston; and means independent of the piston for retaining said block against rotary movement while permitting the block to revolve about the axis of the shaft.

4. In a pump, the combination of an eccentric rotatable about an axis; a plurality of cylinders angularly spaced about said axis and having their axes radial to the first named axis; a block in which said eccentric rotates; a piston reciprocable in each cylinder, each of said pistons having an actuating head mounted in a confining guideway in said block to permit relative motion of the piston and block in a direction transverse to the axis of the piston; and means independent of the piston for retaining said block against rotary movement while permitting the block to revolve about the axis of the shaft, said means comprising an Oldham coupling interposed between said block and a part fixed relatively to said cylinders.

5. In a pump, the combination of an eccentric rotatable about an axis; a plurality of cylinders arranged substantially radially with respect to said axis, and angularly spaced around said axis; a driving member swiveled on said eccentric; plungers, one in each cylinder, each plunger being operatively connected with said driving member to be reciprocated thereby as the eccentric rotates; and an Oldham coupling interposed between said driving member and a part fixed relatively to said cylinders, and serving to prevent rotation of said driving member while permitting it to revolve about the axis of the shaft.

6. In a pump, the combination of an eccentric rotatable about an axis; a plurality of cylinders arranged substantially radially with respect to said axis, and angularly spaced around said axis; a driving member swiveled on said eccentric; plungers, one in each cylinder, each plunger being operatively connected with said driving member to be reciprocated positively thereby as the eccentric rotates; and an Oldham coupling interposed between said driving member and a part fixed relatively to said cylinders, and serving to prevent rotation of said driving member while permitting it to revolve about the axis of the shaft.

PARKER DODGE.